United States Patent
Kawazumi et al.

(10) Patent No.: US 10,086,897 B2
(45) Date of Patent: Oct. 2, 2018

(54) STRUCTURE FOR INSTALLING FUEL PUMP IN FUEL TANK

(71) Applicant: HONDA MOTOR CO., LTD., Tokyo (JP)

(72) Inventors: Takeji Kawazumi, Wako (JP); Toshihisa Nagashii, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/461,005

(22) Filed: Mar. 16, 2017

(65) Prior Publication Data

US 2017/0282990 A1 Oct. 5, 2017

(30) Foreign Application Priority Data

Mar. 31, 2016 (JP) .................................. 2016-71491

(51) Int. Cl.
| | |
|---|---|
| B62J 37/00 | (2006.01) |
| B62J 35/00 | (2006.01) |
| B60K 15/03 | (2006.01) |
| F02M 37/00 | (2006.01) |

(52) U.S. Cl.
CPC .............. B62J 37/00 (2013.01); B60K 15/03 (2013.01); B62J 35/00 (2013.01); F02M 37/0011 (2013.01)

(58) Field of Classification Search
CPC ....... B62J 37/00; B62J 35/00; F02M 37/0011; B60K 15/03
USPC ...................................... 248/544, 686, 346.5
See application file for complete search history.

(56) References Cited

U.S. PATENT DOCUMENTS

| | | | | |
|---|---|---|---|---|
| 4,509,613 | A * | 4/1985 | Yamaguchi | B62J 35/00 180/219 |
| 6,679,292 | B2 * | 1/2004 | Ootaka | B62J 35/00 123/509 |
| 8,286,744 | B2 * | 10/2012 | Mizukura | B62J 35/00 180/69.4 |
| 8,292,115 | B2 * | 10/2012 | Kobayashi | B60K 15/03177 220/319 |
| 2003/0042391 | A1 * | 3/2003 | Hotta | F02B 67/00 248/544 |
| 2007/0169975 | A1 * | 7/2007 | Kubota | B60K 15/073 180/69.4 |
| 2007/0235089 | A1 * | 10/2007 | Koike | F02M 37/103 137/565.17 |

(Continued)

FOREIGN PATENT DOCUMENTS

JP 2011-214434 A 10/2011

*Primary Examiner* — Muhammad Ijaz
(74) *Attorney, Agent, or Firm* — Birch, Stewart, Kolasch & Birch, LLP

(57) ABSTRACT

In a structure for installing a fuel pump in a fuel tank, in which the fuel pump is attached to the fuel tank by clamping a flange portion of a pump case of the fuel pump between the fuel tank and a retainer fastened to the fuel tank, an interference portion is formed integrally with an inner peripheral edge of the retainer while being overhung inward in a radial direction, the interference portion being capable of interfering with any one of protruding portions when a relative position in a peripheral direction of the retainer with respect to the flange portion is set at a non-normal position, and a non-normal surface of opposite surfaces of the retainer is faced to the flange portion.

7 Claims, 7 Drawing Sheets

(56) References Cited

U.S. PATENT DOCUMENTS

| | | | |
|---|---|---|---|
| 2009/0184118 A1* | 7/2009 | Kobayashi | B60K 15/03177 220/62.22 |
| 2009/0242300 A1* | 10/2009 | Mizukura | B62J 35/00 180/69.4 |
| 2017/0282990 A1* | 10/2017 | Kawazumi | B60K 15/03 |
| 2017/0341697 A1* | 11/2017 | McKinster | B62J 35/00 |

* cited by examiner

STRUCTURE FOR INSTALLING FUEL PUMP IN FUEL TANK

BACKGROUND OF THE INVENTION

Field of the Invention

The present invention related to a structure for installing a fuel pump in a fuel tank, in which a pump case for the fuel pump is formed to include: a tubular portion having one end part thereof inserted into an insertion hole formed in the fuel tank; an end wall portion closing the one end part of the tubular portion while facing an outside of the fuel tank, and on which a plurality of protruding portions configuring a part of the fuel pump are protuberantly arranged; and an annular flange portion overhanging from the one end part of the tubular portion to a lateral side while being opposed to an outer surface of the fuel tank, and a retainer clamping the flange portion between an outer surface of the fuel tank and the retainer surrounds the protruding portions and is fastened to the fuel tank.

Description of the Related Art

Such a structure is known in Japanese Patent Application Laid-open No. 2011-214434 that a pump case for a fuel pump has one end part including a flange portion, and the flange portion is attached to a fuel tank by being clamped between the fuel tank and a retainer fastened to the fuel tank.

In the meantime, in a structure for installing a pump case for a fuel pump in a fuel tank by using a retainer, there is a possibility that a wrong surface of opposite surfaces of the retainer are fastened to the fuel tank. In order to prevent such an erroneous assembling, in the structure disclosed in Japanese Patent Application Laid-open No. 2011-214434, a bent portion is formed at an edge portion of the retainer. However, depending on the fuel pump, there is such a case that a relative position in a peripheral direction of the retainer with respect to the pump case is regulated. In this case, in the structure disclosed in Japanese Patent Application Laid-open No. 2011-214434, there is a possibility that since the position in the peripheral direction of the retainer with respect to the pump case is not regulated, the erroneous assembling can not be found even if the erroneous assembling is caused.

SUMMARY OF THE INVENTION

The present invention has been achieved in view of the above-mentioned circumstances, and it is an object thereof to provide a structure for installing a fuel pump in a fuel tank, in which occurrence of erroneous assembling can be certainly found, the erroneous assembling being a state where a relative position in a peripheral direction of a retainer with respect to a pump case is set at a non-normal position, the non-normal position being an improper position and a non-normal surface of opposite surfaces of the retainer is faced to the pump case, the non-normal surface being an improper surface, that is, a surface that should not face the pump case.

In order to achieve the object, according to a first feature of the present invention, there is provided a structure for installing a fuel pump in a fuel tank, in which a pump case for the fuel pump is formed to include: a tubular portion having one end part thereof inserted into an insertion hole formed in the fuel tank; an end wall portion closing the one end part of the tubular portion while facing an outside of the fuel tank, and on which a plurality of protruding portions configuring a part of the fuel pump are protuberantly arranged; and an annular flange portion overhanging from the one end part of the tubular portion to a lateral side while being opposed to an outer surface of the fuel tank, and a retainer clamping the flange portion between an outer surface of the fuel tank and the retainer surrounds the protruding portions and is fastened to the fuel tank, wherein an interference portion is formed integrally with an inner peripheral edge of the retainer while being overhung inward in a radial direction, the interference portion being capable of interfering with any one of the protruding portions when a relative position in a peripheral direction of the retainer with respect to the flange portion is set at a non-normal position, and a non-normal surface of opposite surfaces of the retainer is faced to the flange portion.

With the first feature of the present invention, the interference portion is formed integrally with the inner peripheral edge of the annular retainer while being overhung inward in the radial direction, and the interference portion interferes with any one of the protruding portions when the retainer is arranged in the position displaced from the normal relative position in the peripheral direction with respect to the flange portion and the normal surface, of the opposite surfaces, of the retainer with respect to the flange portion is reversed, that is, the non-normal surface of the retainer is faced to the flange portion. For this reason, the erroneous assembling of the retainer can be certainly informed.

According to a second feature of the present invention, in addition to the first feature, the protruding portions are respectively arranged in three areas of four areas formed by equiangularly quadrisecting the end wall portion, and the interference portion is formed integrally with one position in the peripheral direction of the inner peripheral edge of the retainer so as to be arranged in the remaining area of the four areas when the relative position in the peripheral direction of the retainer with respect to the flange portion is set at the normal position, and the normal surface of the opposite surfaces of the retainer is faced to the flange portion.

With the second feature of the present invention, the equiangularly quadrisected four areas are set to the end wall portion of the pump case, the protruding portions are respectively arranged in the three areas of the four areas, and the single interference portion is arranged in the remaining area of the four areas when the relative position in the peripheral direction of the retainer with respect to the flange portion is set at the normal position and the normal surface of the opposite surfaces of the retainer is faced to the flange portion. For this reason, it is possible to easily find whether or not the erroneous assembling is caused, according to the position of the interference portion formed in one position in the peripheral direction of the inner peripheral edge of the retainer.

According to a third feature of the present invention, in addition to the second feature, in a projection view with respect to a plane perpendicular to an axis of the pump case, positions of the protruding portions are set in the end wall portion so that an imaginary circle passes over the plurality of protruding portions, the imaginary circle passing through a tip end part of the interference portion with a center position of the end wall portion as a center.

With the third feature of the present invention, in the projection view with respect to the plane perpendicular to the axis of the pump case, the imaginary circle passes over the plurality of protruding portions, the imaginary circle passing through the tip end part of the interference portion.

For this reason, the interference portion can certainly interfere with any one of the protruding portions in the erroneous assembling condition.

According to a fourth feature of the present invention, in addition to the third feature, one of the plurality of protruding portions is a delivery joint portion delivering fuel from the fuel pump, and the remaining protruding portions are a pair of connector portions for achieving electric connection with the fuel pump.

With the fourth feature of the present invention, one protruding portion is made to function as the delivery joint portion, and the remaining protruding portions are made to function as the connector portions. For this reason, an exclusive protruding portion for detecting the erroneous assembling is not required.

According to a fifth feature of the present invention, in addition to any one of the first to fourth features, a positioning device is provided between the retainer and at least one of the end wall portion and the flange portion, the positioning device determining the relative positions in the peripheral direction of the flange portion and the retainer so that the interference portion interferes with one of the plurality of protruding portions when the relative position in the peripheral direction of the retainer with respect to the flange portion is set at the non-normal position, and the non-normal surface of the opposite surfaces of the retainer is faced to the flange portion.

With the fifth feature of the present invention, the positioning device provided between the retainer and at least one of the end wall portion and the flange portion determines the relative positions in the peripheral direction of the flange portion and the retainer so that the interference portion interferes with one of the plurality of protruding portions when the relative position in the peripheral direction of the retainer with respect to the flange portion is set at the non-normal position and the non-normal surface of the opposite surfaces of the retainer is faced to the flange portion. For this reason, occurrence of the erroneous assembling can be certainly found.

According to a sixth feature of the present invention, in addition to the fifth feature, the positioning device is configured with a pair of positioning protrusions and a pair of locking portions, the pair of positioning protrusions being protuberantly provided on at least one of the end wall portion and the flange portion so as to be arranged on one diameter line, the pair of locking portions being provided on the retainer so as to be respectively engaged with the positioning protrusions.

With the sixth feature of the present invention, the positioning device is configured with the pair of positioning protrusions and the pair of locking portions, the pair of positioning protrusions being protuberantly arranged on the one diameter line on at least one of the end wall portion and the flange portion, the pair of locking portions being provided on the retainer. For this reason, even if the normal surface, of the opposite surfaces, of the retainer with respect to the flange portion is reversed, the relative positions in the peripheral direction of the flange portion and the retainer are determined by the positioning device, and the occurrence of the erroneous assembling can be certainly found.

According to a seventh feature of the present invention, in addition to the fourth feature, a mark is provided on an outer surface of the fuel tank, the mark being matched with a direction in which the delivery joint portion is directed when the fuel pump is installed in the fuel tank in a normal relative position.

With the seventh feature of the present invention, the delivery joint portion is directed to the mark provided on the outer surface of the fuel tank when the fuel pump is installed in the fuel tank in the normal relative position. For this reason, if the fuel pump is installed in the fuel tank at a position displaced from the normal relative position, the displacement of the fuel pump can be visually easily found.

According to an eighth feature of the present invention, in addition to the seventh feature, the retainer includes a positioning portion, the positioning portion being directed to the mark when the retainer is fastened to the fuel tank in a normal posture with respect to the fuel tank.

With the eighth feature of the present invention, when the retainer is fastened to the fuel tank in the normal posture with respect to the fuel tank, the positioning portion for the retainer is directed to the mark. For this reason, the relative installation positions of the fuel pump and the retainer with respect to the fuel tank can be visually easily recognized, and the erroneous assembling can be prevented in a multiple manner.

The above and other objects, characteristics and advantages of the present invention will be clear from detailed descriptions of the preferred embodiment which will be provided below while referring to the attached drawings.

DESCRIPTION OF THE PREFERRED EMBODIMENT

Figure 1:
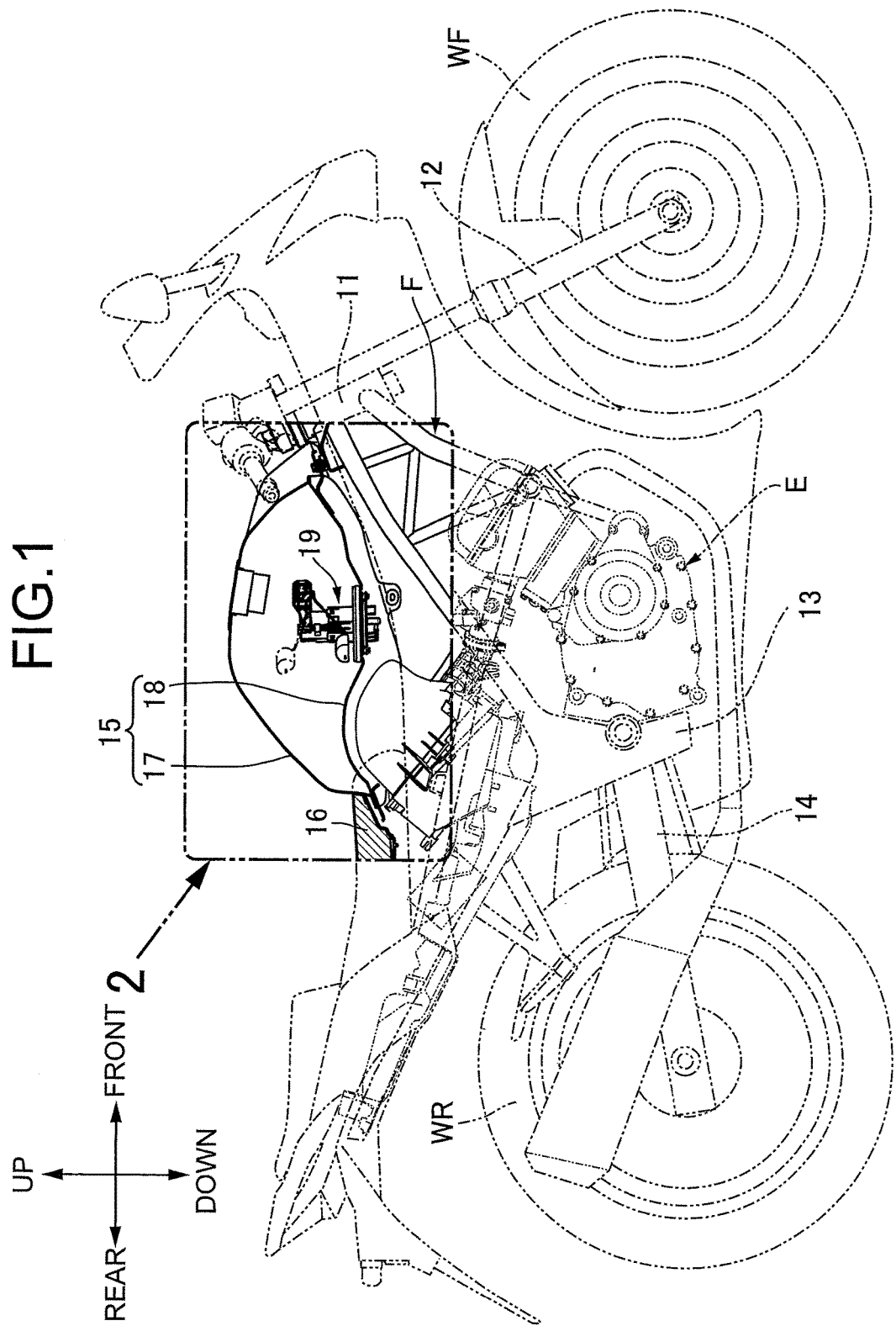
FIG. 1 is a right side view of a two-wheeled motor vehicle.

An embodiment of the present invention will be described with reference to accompanying FIG. 1 to FIG. 7. Firstly, in FIG. 1, a front fork 12 to which a front wheel WF is pivotally supported is steerably supported by a head pipe 11 provided at a front end of a vehicle body frame F of a two-wheeled motor vehicle. Also, a front end part of a swing arm 14 having a rear end to which a rear wheel WR is pivotally supported is supported by a pivot plate 13 so as to be swingable up and down, the pivot plate 13 being provided to an intermediate portion of the vehicle body frame F in a longitudinal direction. In the vehicle body frame F, an internal combustion engine E producing power for driving the rear wheel WR is mounted so as to be arranged between the front wheel WF and the rear wheel WR, and also, a fuel tank 15 positioned above the internal combustion engine E is mounted in the vehicle body frame F. A tandem riding seat 16 positioned behind the fuel tank 15 is supported by a rear portion of the vehicle body frame F.

Figure 2:
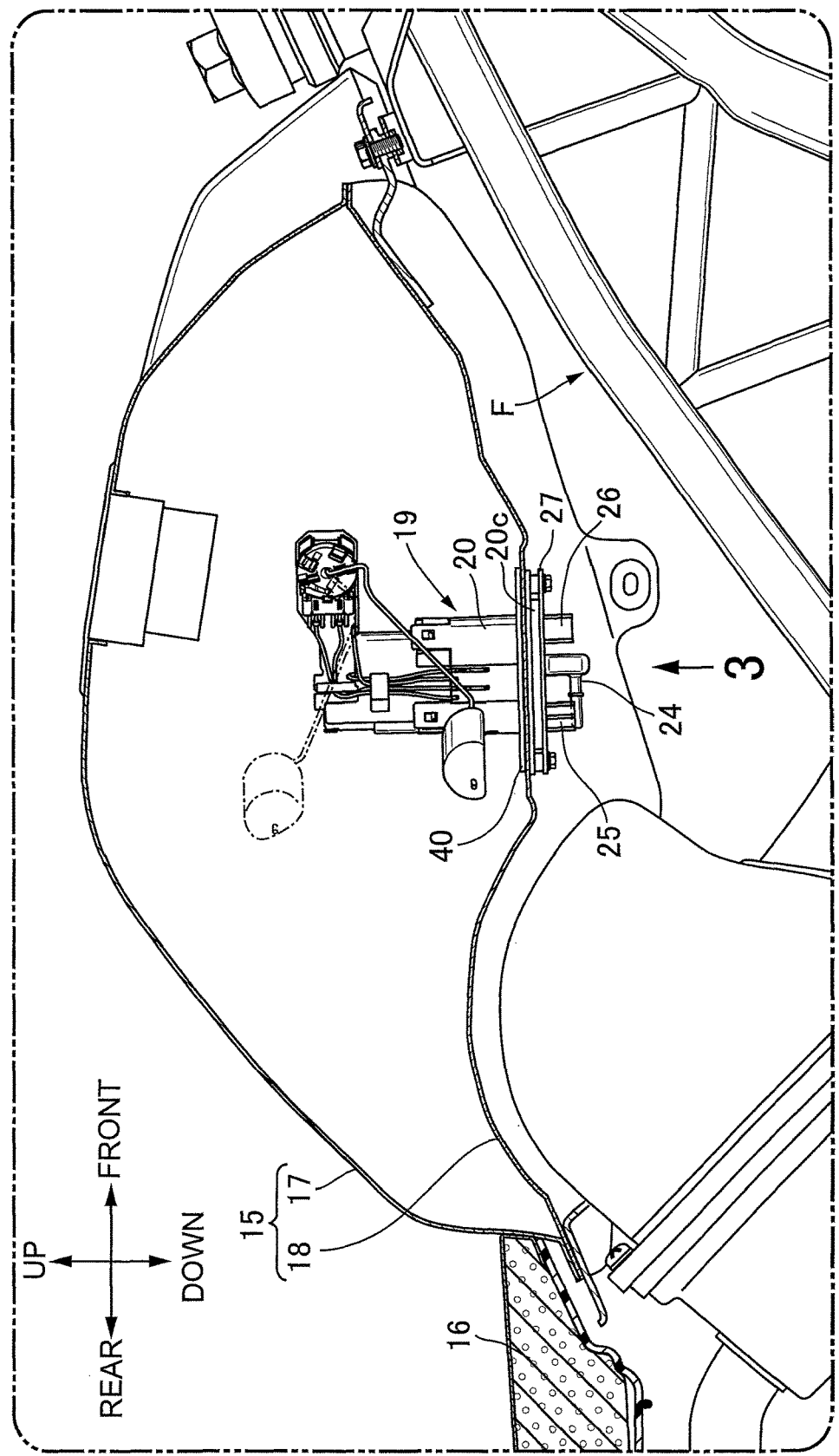
FIG. 2 is an enlarged view of a portion indicated by an arrow 2 in FIG. 1.

In FIG. 2, the fuel tank 15 is configured by coupling peripheral edge portions of an upper half body 17 and a lower half body 18 to each other. A fuel pump 19 for supplying fuel in the fuel tank 15 to the internal combustion engine E side is attached to a bottom wall, that is, the lower half body 18, of the fuel tank 15.

Figure 3:
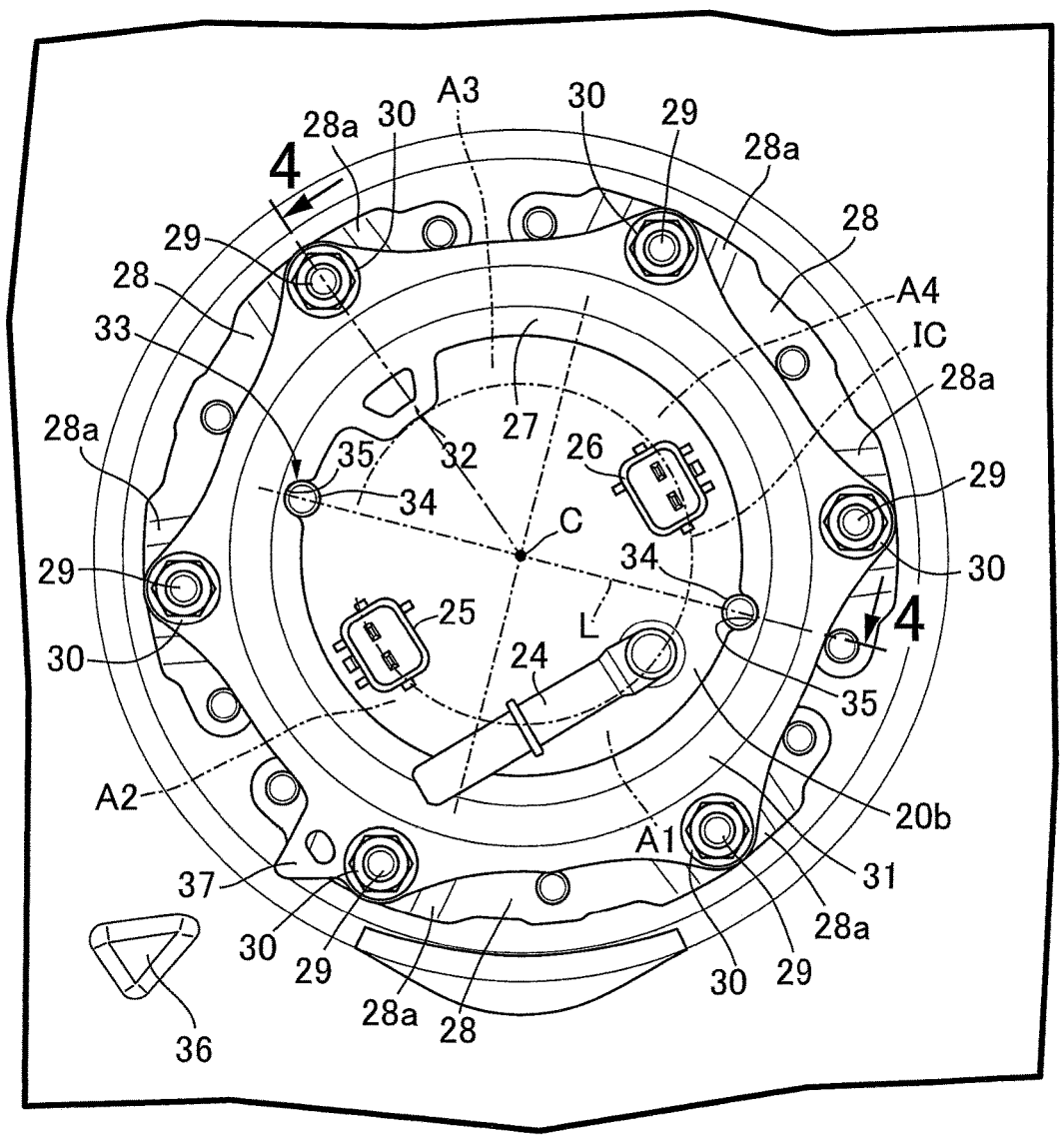
FIG. 3 is a view when viewed from an arrow 3 in FIG. 2 when a relative position in a peripheral direction of a retainer with respect to a flange portion is set at a normal position and a normal surface of opposite surfaces of the retainer is faced to the flange portion.
Figure 4:
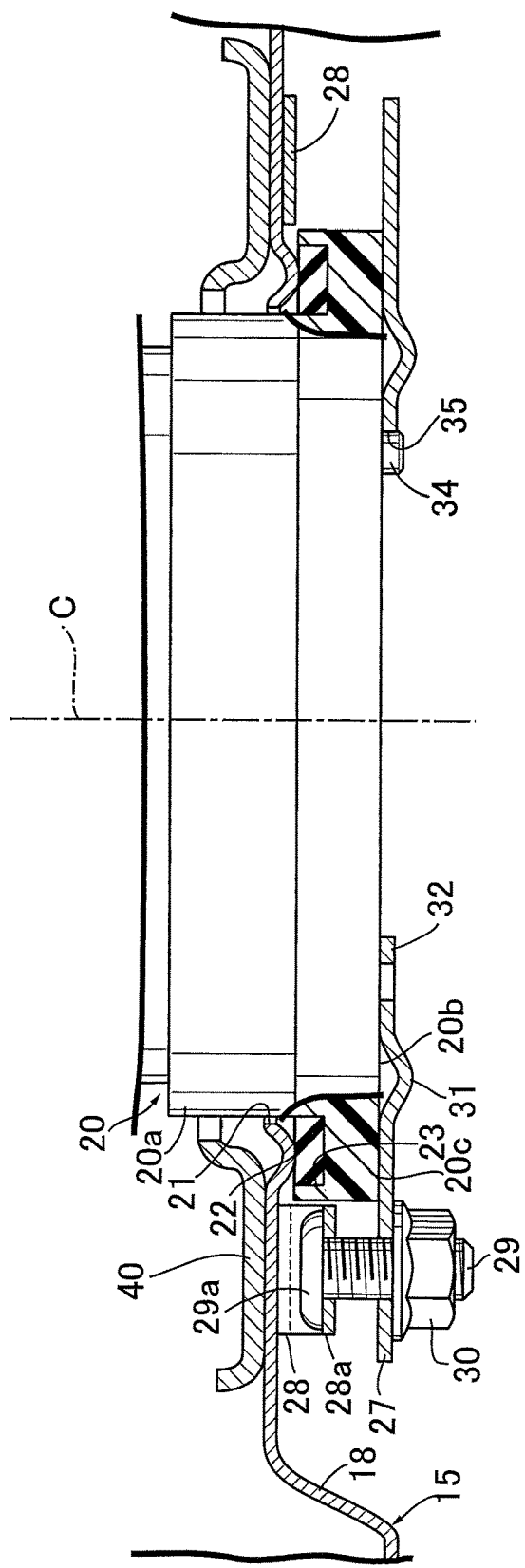
FIG. 4 is a sectional view taken along line 4-4 in FIG. 3.

With reference to FIG. 3 and FIG. 4 together, a pump case 20 for the fuel pump 19 is configured to include a tubular portion 20a, an end wall portion 20b, and an annular flange portion 20c. The tubular portion 20a has one end part thereof inserted into an insertion hole 21 formed in the lower half body 18 of the fuel tank 15. The end wall portion 20b closes the one end part of the tubular portion 20a while facing the outside of the fuel tank 15. The annular flange portion 20c overhangs from the one end part (lower end part) of the tubular portion 20a to a lateral side while being opposed to an outer surface of the lower half body 18 of the fuel tank 15. An annular groove 23 for storing therein an annular seal member 22 elastically brought into contact with a peripheral edge portion of the insertion hole 21 from below is formed in the flange portion 20c.

In the end wall portion 20b, a plurality of (three in the embodiment) protruding portions configuring a part of the fuel pump 19 are protuberantly arranged. In the embodiment, one of the three protruding portions is a delivery joint portion 24 having a shape bent in a substantially L-shape so as to deliver the fuel from the fuel pump 19. The remaining protruding portions are a pair of connector portions 25, 26 for achieving electric connection with respect to the fuel pump 19.

The annular retainer 27 clamping the flange portion 20c of the pump case 20 for the fuel pump 19 between an outer surface of the fuel tank 15 and the annular retainer 27 is fastened to the lower half body 18 of the fuel tank 15 while surrounding the delivery joint portion 24 and the connector portions 25, 26.

Three arcuate fastening supporting plates 28 arranged around the insertion hole 21 are fixed to the outer surface of the lower half body 18 of the fuel tank 15 by spot welding or the like. A pair of supporting protruding portions 28a protruding to a side spaced from the outer surface of the lower half body 18 are formed integrally with each of the fastening supporting plates 28. In addition, the fastening supporting plates 28 are welded to the lower half body 18 of the fuel tank 15 around the insertion hole 21 so that the supporting protruding portions 28a are arranged in six positions at regular intervals in a peripheral direction around the insertion hole 21. Also, an annular flange receiver reinforcing plate 40 is fixed to an inner surface of the lower half body 18 of the fuel tank 15 by welding so as to surround the insertion hole 21.

The retainer 27 abuts against the flange portion 20c of the fuel pump 19 from below. Bolts 29 having enlarged diameter protrusions 29a abutting against and engaged with the supporting protruding portions 28a from above are inserted into the supporting protruding portions 28a of the fastening supporting plates 28 and the retainer 27. Nuts 30 screwed around protruding portions of the bolts 29 protruding from the retainer 27 are fastened. Thereby, the retainer 27 is fastened to the lower half body 18 by clamping the flange portion 20c between the retainer 27 and the outer surface of the lower half body 18 of the fuel tank 15.

An annular swollen portion 31 for increasing strength of the retainer 27 is formed integrally with the retainer 27 so as to be swollen to a side opposite to the flange portion 20c when the normal surface of the opposite surfaces of the retainer 27 is faced to the flange portion 20c.

Further, the interference portion 32 is formed integrally with the inner peripheral edge of the retainer 27 while being overhung inward in the radial direction. The interference portion 32 can interfere with any one of the protruding portions, that is, any one of the delivery joint portion 24 and the connector portions 25, 26 when the relative position in the peripheral direction of the retainer 27 with respect to the flange portion 20c is set at the non-normal position, and the non-normal surface of the opposite surfaces of the retainer 27 is faced to the flange portion 20c.

Also, four areas A1, A2, A3, A4 formed by being equiangularly quadrisected are set on the end wall portion 20b of the pump case 20 for the fuel pump 19. The delivery joint portion 24 and the connector portions 25, 26 are respectively arranged in the three areas A1, A2, A4 of the four areas A1 to A4. The interference portion 32 is formed integrally with one position in the peripheral direction of the inner peripheral edge of the retainer 27 so as to be arranged in the remaining area A3 of the four areas A1 to A4 when the relative position in the peripheral direction of the retainer 27 with respect to the flange portion 20c is set at the normal position, and the normal surface of the opposite surfaces of the retainer 27 is faced to the flange portion 20c.

In addition, in the projection view (the view corresponding to FIG. 3) with respect to the plane perpendicular to the axis of the pump case 20, the positions of the delivery joint portion 24 and the connector portions 25, 26 in the end wall portion 20b are set so that an imaginary circle IC passes over the delivery joint portion 24 and the connector portions 25, 26, the imaginary circle IC passing through a tip end part of the interference portion 32 with a center position C of the end wall portion 20b as a center.

Also, a positioning means 33 is provided between the retainer 27 and at least one of the end wall portion 20b and the flange portion 20c (in the embodiment, the end wall portion 20b), the positioning means 33 determining the relative positions in the peripheral direction of the flange portion 20c and the retainer 27 so that to allow the interference portion 32 interferes with one of the delivery joint portion 24 and the connector portions 25, 26 when the relative position in the peripheral direction of the retainer 27 with respect to the flange portion 20c is set at the non-normal position, and the non-normal surface of the opposite surfaces of the retainer 27 is faced to the flange portion 20c.

The positioning means 33 is configured with a pair of positioning protrusions 34 and a pair of locking portions 35, the pair of positioning protrusions 34 being protuberantly arranged on at least one of the end wall portion 20b and the flange portion 20c (in the embodiment, the end wall portion 20b) so as to be arranged on one diameter line L, the pair of locking portions 35 being provided to the retainer 27 so as to be respectively engaged with the positioning protrusions 34. In the embodiment, the locking portions 35 are recessed portions formed in the inner peripheral edge of the retainer 27.

Figure 5:
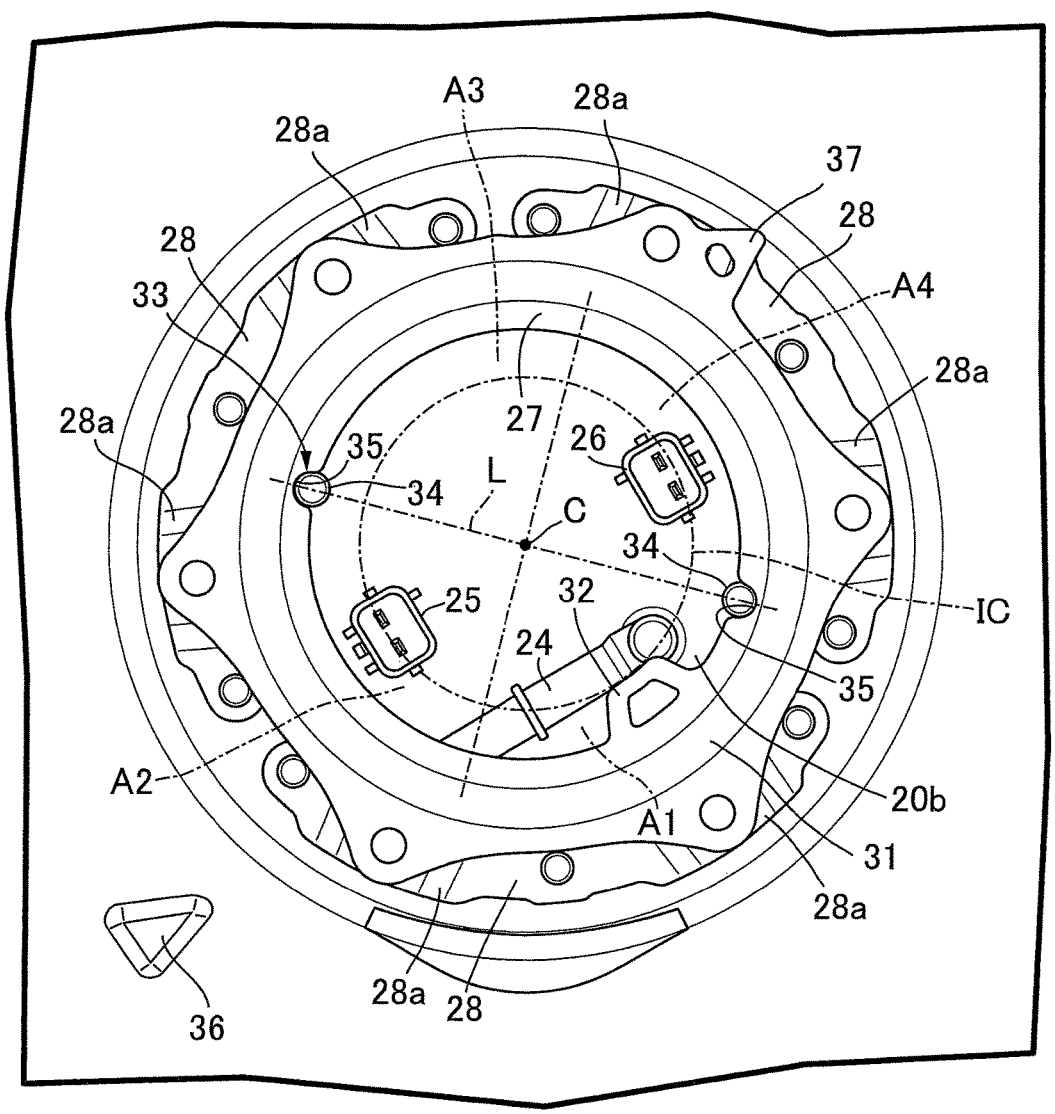
FIG. 5 is a view corresponding to FIG. 3 when the relative position in the peripheral direction of the retainer with respect to the flange portion is set at the non-normal position displaced by 180 degrees from the position in FIG. 3.

That is, when the normal surface of the opposite surfaces of the retainer 27 is faced to the flange portion 20c, as shown in FIG. 3, the interference portion 32 interferes with none of the delivery joint portion 24 and the connector portions 25, 26. When the interference portion 32 is located in the area A3, the relative position in the peripheral direction of the retainer 27 with respect to the flange portion 20c is the normal position. When the retainer 27 is rotated by 180 degrees from the normal position, as shown in FIG. 5, the interference portion 32 interferes with the delivery joint portion 24 located in the area A1.

Figure 6:
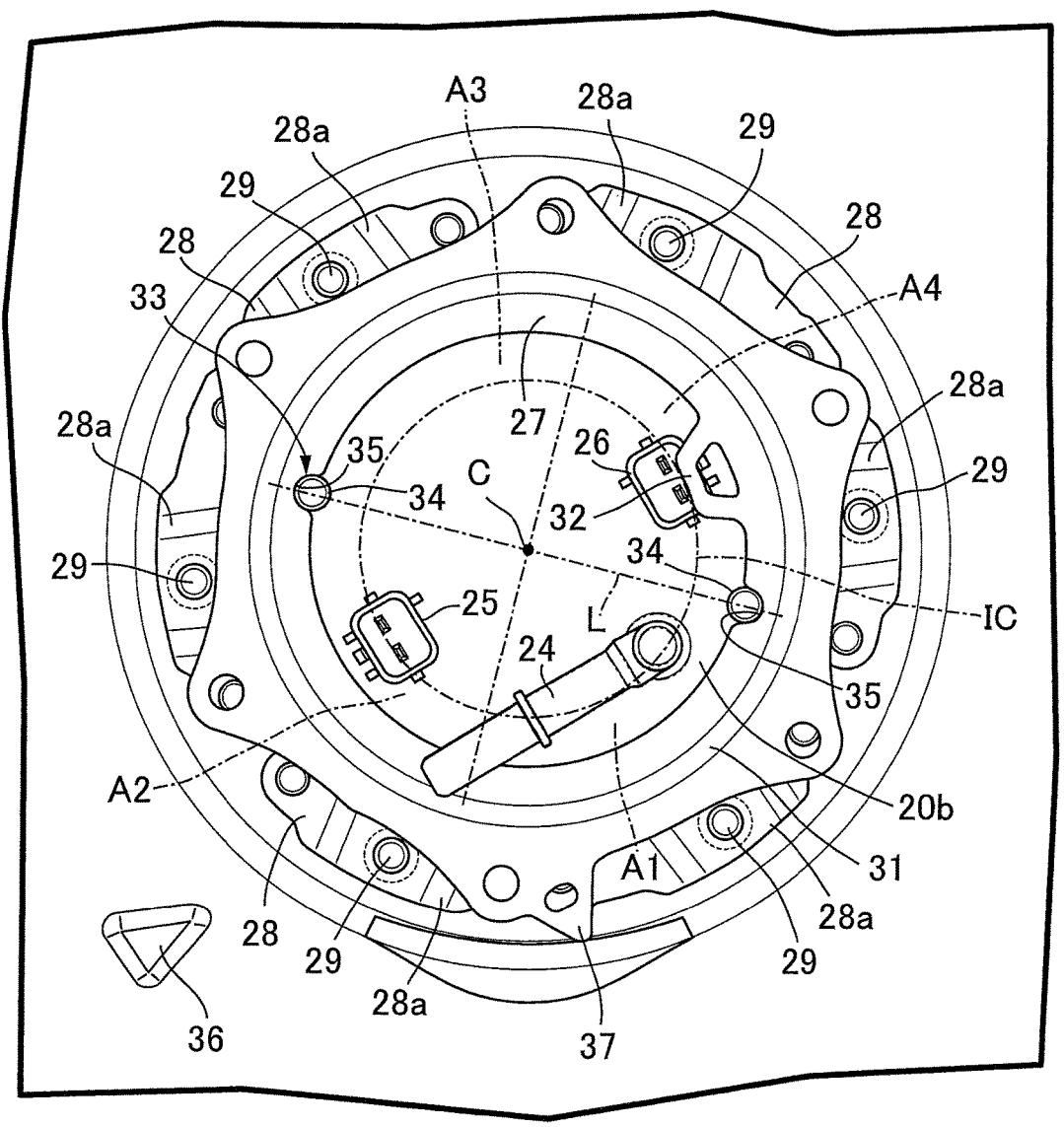
FIG. 6 is a view corresponding to FIG. 3 when the normal surface, of the opposite surfaces, of the retainer with respect to the flange portion, as shown in FIG. 3, is reversed, that is, the non-normal surface of the retainer is faced to the flange portion.
Figure 7:
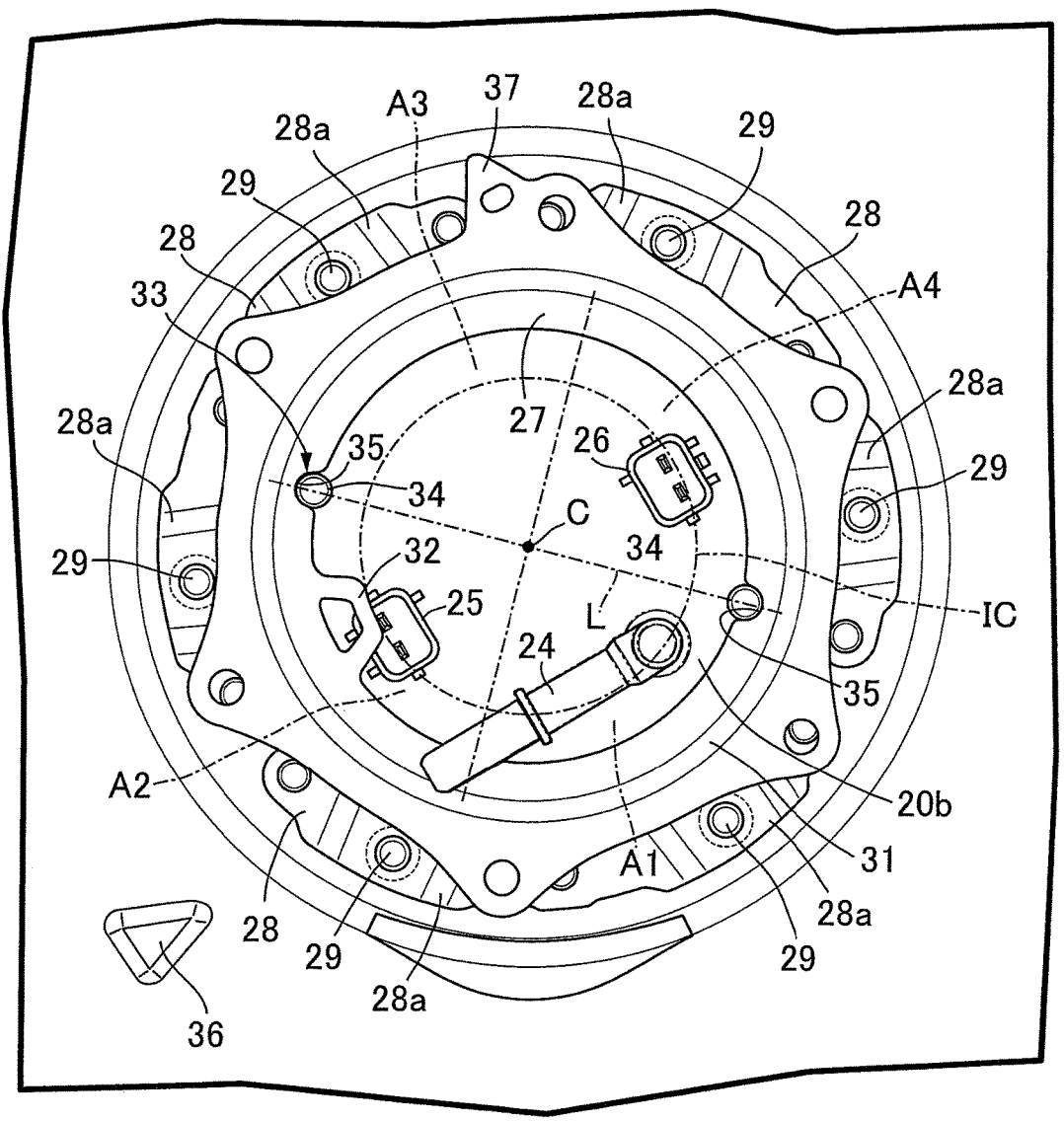
FIG. 7 is a view corresponding to FIG. 3 when the normal surface, of the opposite surfaces, of the retainer with respect to the flange portion, as shown in FIG. 3, is reversed, that is, the non-normal surface of the retainer is faced to the flange portion, and the relative position in the peripheral direction of the retainer with respect to the flange portion is set at the non-normal position displaced by 180 degrees from the position in FIG. 6.

Also, when the normal surface, of the opposite surfaces, of the retainer 27 with respect to the flange portion 20c, is reversed, that is, the non-normal surface of the retainer 27 is faced to the flange portion 20c, as shown in FIG. 6, the interference portion 32 interferes with the connector portion 26 in the area A4. Or, as shown in FIG. 7, the interference portion 32 interferes with the connector portion 25 located in the area A2.

Also, a mark 36 is provided on an outer surface of the lower half body 18 of the fuel tank 15, the mark 36 being matched with a direction in which the delivery joint portion 24 is directed when the fuel pump 19 is installed in the fuel tank 15 in the normal relative position. The retainer 27 is provided with a positioning portion 37 protruding to a side directed to the mark 36 when the retainer 27 is fastened to the fuel tank 15 in the normal posture with respect to the fuel tank 15.

Next, operation of the embodiment will be described. The interference portion 32 is formed integrally with the inner peripheral edge of the retainer 27 while being overhung inward in the radial direction, the interference portion 32 being capable of interfering with any one of the delivery joint portion 24 and the connector portions 25, 26 when the relative position in the peripheral direction of the retainer 27 with respect to the flange portion 20c of the pump case 20 is set at the non-normal position, and the non-normal surface of the opposite surfaces of the retainer 27 is faced to the flange portion 20c, the delivery joint portion 24 and the connector portions 25, 26 being the protruding portions protuberantly arranged on the end wall portion 20b of the pump case 20. With this arrangement, when the retainer 27 is arranged in the position displaced from the normal relative position in the peripheral direction with respect to the flange portion 20c, and the normal surface, of the opposite surfaces, of the retainer 27 with respect to the flange portion 20c is reversed, that is, the non-normal surface of the retainer 27 is faced to the flange portion 20c, the interference portion 32 interferes with any one of the delivery joint portion 24 and the connector portions 25, 26. For this reason, the erroneous assembling of the retainer 27 can be certainly informed.

Also, the delivery joint portion 24 and the connector portions 25, 26 are respectively arranged in the three areas A1, A2, A4 of the four areas A1, A2, A3, A4 formed by equiangularly quadrisecting the end wall portion 20b, and the interference portion 32 is formed integrally with one position in the peripheral direction of the inner peripheral edge of the retainer 27 so as to be arranged in the remaining area A3 of the four areas A1 to A4 when the relative position in the peripheral direction of the retainer 27 with respect to the flange portion 20c is set at the normal position, and the normal surface of the opposite surfaces of the retainer 27 is faced to the flange portion 20c. For this reason, it is possible to easily find whether or not the erroneous assembling is caused, according to the position of the interference portion 32 formed in one position in the peripheral direction of the inner peripheral edge of the retainer 27.

Also, in the projection view with respect to the plane perpendicular to the axis of the pump case 20, the positions of the delivery joint portion 24 and the connector portions 25, 26 are set in the end wall portion 20b so that the imaginary circle IC passes over the delivery joint portion 24 and the connector portions 25, 26, the imaginary circle IC passing through the tip end part of the interference portion 32 with the center position C of the end wall portion 20b as the center. For this reason, the interference portion 32 can certainly interfere with any one of the delivery joint portion 24 and the connector portions 25, 26 in the erroneous assembling condition.

Also, one of the plurality of protruding portions 24 to 26 is the delivery joint portion 24 for delivering the fuel from the fuel pump 19, and the remaining protruding portions are the pair of connector portions 25, 26 for achieving the electric connection with respect to the fuel pump 19. For this reason, an exclusive protruding portion for detecting the erroneous assembling is not required.

Also, the positioning means 33 is provided between the retainer 27 and at least one of the end wall portion 20b and the flange portion 20c (in the embodiment, the end wall portion 20b), the positioning means 33 determining the relative positions in the peripheral direction of the flange portion 20c and the retainer 27 so that the interference portion 32 interferes with one of the delivery joint portion 24 and the connector portions 25, 26 when the relative position in the peripheral direction of the retainer 27 with respect to the flange portion 20c is set at the non-normal position, and the non-normal surface of the opposite surfaces of the retainer 27 is faced to he flange portion 20c. For this reason, occurrence of the erroneous assembling can be certainly found.

Also, the positioning means 33 is configured with the pair of positioning protrusions 34 and the pair of locking portions 35, the pair of positioning protrusions 34 being protuberantly arranged on at least one of the end wall portion 20b and the flange portion 20c (in the embodiment, the end wall portion 20b) so as to be arranged on the one diameter line L, the pair of locking portions 35 being provided to the retainer 27 so as to be respectively engaged with the positioning protrusions 34. For this reason, even if the normal surface, of the opposite surfaces, of the retainer 27 with respect to the flange portion 20c is reversed, that is, the non-normal surface of the retainer 27 is faced to the flange portion 20c, the relative positions in the peripheral direction of the flange portion 20c and the retainer 27 are determined by the positioning means 33, and the occurrence of the erroneous assembling can be certainly found.

Also, the mark 36 is provided on the outer surface of the fuel tank 15, the mark 36 being matched with the direction in which the delivery joint portion 24 is directed when the fuel pump 19 is installed in the fuel tank 15 in the normal relative position. For this reason, if the fuel pump 19 is installed in the fuel tank 15 at a position displaced from the normal relative position, the displacement of the fuel pump 19 can be visually easily found.

Further, the retainer 27 is provided with the positioning portion 37 that is directed to the mark 36 when the retainer 27 is fastened to the fuel tank 15 in the normal posture with respect to the fuel tank 15. For this reason, the relative installation positions of the fuel pump 19 and the retainer 27 with respect to the fuel tank 15 can be visually easily recognized, and the erroneous assembling can be prevented in the multiple manner.

An embodiment of the present invention is explained above, but the present invention is not limited to the above-mentioned embodiment and may be modified in a variety of ways as long as the modifications do not depart from the gist of the present invention.

What is claimed is:

1. A combination of a fuel tank and a fuel pump in the fuel tank, in which a pump case for the fuel pump is formed to include: a tubular portion having one end part thereof inserted into an insertion hole formed in the fuel tank; an end wall portion closing the one end part of the tubular portion while facing an outside of the fuel tank, and on which a plurality of protruding portions configuring a part of the fuel pump are protuberantly arranged; and an annular flange portion overhanging from the one end part of the tubular portion to a lateral side while being opposed to an outer surface of the fuel tank, and a retainer clamping the flange portion between an outer surface of the fuel tank and the retainer surrounds the protruding portions and is fastened to the fuel tank, wherein an interference portion is formed integrally with an inner peripheral edge of the retainer while being overhung inward in a radial direction, the interference portion being capable of interfering with any one of the protruding portions when a relative position in a peripheral direction of the retainer with respect to the flange portion is set at an improper position, and an improper surface of opposite surfaces of the retainer is faced to the flange portion, and wherein a positioning device is provided between the retainer and at least one of the end wall portion and the flange portion, the positioning device determining the relative positions in the peripheral direction of the flange portion and the retainer so that the interference portion interferes with one of the plurality of protruding portions when the relative position in the peripheral direction of the retainer with respect to the flange portion is set at the improper position, and the improper surface of the opposite surfaces of the retainer is faced to the flange portion.

2. The combination of a fuel tank and a fuel pump according to claim 1, wherein the protruding portions are respectively arranged in three areas of four areas formed by equiangularly quadrisecting the end wall portion, and the interference portion is formed integrally with one position in the peripheral direction of the inner peripheral edge of the retainer so as to be arranged in the remaining area of the four areas when the relative position in the peripheral direction of the retainer with respect to the flange portion is set at a normal position, and a normal surface of the opposite surfaces of the retainer is faced to the flange portion.

3. The combination of a fuel tank and a fuel pump according to claim 2, wherein when viewed in an axial direction of the pump case, positions of the protruding portions are set in the end wall portion so that an imaginary circle passes over the plurality of protruding portions, the imaginary circle passing through a tip end part of the interference portion with a center position of the end wall portion as a center.

4. The combination of a fuel tank and a fuel pump according to claim 3, wherein one of the plurality of protruding portions is a delivery joint portion delivering fuel from the fuel pump, and the remaining protruding portions are a pair of connector portions for achieving electric connection with the fuel pump.

5. The combination of a fuel tank and a fuel pump according to claim 1, wherein the positioning device is configured with a pair of positioning protrusions and a pair of locking portions, the pair of positioning protrusions being protuberantly provided on at least one of the end wall portion and the flange portion so as to be arranged on one diameter line, the pair of locking portions being provided on the retainer so as to be respectively engaged with the positioning protrusions.

6. The combination of a fuel tank and a fuel pump according to claim 4, wherein a mark is provided on an outer surface of the fuel tank, the mark being matched with a direction in which the delivery joint portion is directed when the fuel pump is installed in the fuel tank in a normal relative position.

7. The combination of a fuel tank and a fuel pump according to claim 6, wherein the retainer includes a positioning portion, the positioning portion being directed to the mark when the retainer is fastened to the fuel tank in a normal posture with respect to the fuel tank.

* * * * *